US007738356B2

(12) United States Patent
Kim

(10) Patent No.: US 7,738,356 B2
(45) Date of Patent: Jun. 15, 2010

(54) MULTIPLE STREAM CYCLIC-SHIFTED DELAY TRANSMITTER

(75) Inventor: Joonsuk Kim, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 799 days.

(21) Appl. No.: 11/168,832

(22) Filed: Jun. 28, 2005

(65) Prior Publication Data

US 2007/0008946 A1 Jan. 11, 2007

(51) Int. Cl.
*H04J 11/00* (2006.01)
(52) U.S. Cl. .................. 370/208; 370/203; 370/517; 370/519
(58) Field of Classification Search ................ 370/203, 370/208, 210, 206, 281, 328, 480, 280, 310, 370/314, 315, 338, 344, 517, 519; 455/91, 455/101, 102, 103, 18, 97, 242.1, 242.2, 455/445; 375/260, 267, 299, 347; 348/388.1
See application file for complete search history.

(56) References Cited

U.S. PATENT DOCUMENTS

| | | | | |
|---|---|---|---|---|
| 5,812,951 | A * | 9/1998 | Ganesan et al. ............. 455/445 |
| 6,377,632 | B1 * | 4/2002 | Paulraj et al. ............... 375/299 |
| 6,804,307 | B1 * | 10/2004 | Popovic ...................... 375/299 |
| 6,931,238 | B1 * | 8/2005 | Aizawa et al. .............. 455/101 |
| 2005/0195763 | A1 * | 9/2005 | Kadous et al. .............. 370/328 |
| 2005/0201270 | A1 * | 9/2005 | Song et al. .................. 370/208 |
| 2005/0249174 | A1 * | 11/2005 | Lundby et al. .............. 370/338 |
| 2005/0254592 | A1 * | 11/2005 | Naguib et al. ............... 375/267 |
| 2005/0259567 | A1 * | 11/2005 | Webster et al. ............. 370/208 |
| 2005/0265275 | A1 * | 12/2005 | Howard et al. .............. 370/328 |
| 2006/0013186 | A1 * | 1/2006 | Agrawal et al. ............. 370/344 |
| 2006/0067263 | A1 * | 3/2006 | Li et al. ...................... 370/315 |
| 2006/0111054 | A1 * | 5/2006 | Pan et al. .................... 455/101 |
| 2006/0182017 | A1 * | 8/2006 | Hansen et al. .............. 370/208 |
| 2006/0193245 | A1 * | 8/2006 | Aghvami et al. ........... 370/208 |
| 2006/0251183 | A1 * | 11/2006 | Soffer ......................... 375/267 |

(Continued)

FOREIGN PATENT DOCUMENTS

CN          1476695 A       2/2004

(Continued)

OTHER PUBLICATIONS

Gunther Auer, "Channel Estimation for OFDM with Cyclic Delay Diversity," IEEE International Symposium on Barcelona, Spain, ISBN: 0-7803-8523-3, Sep. 2004, pp. 1792-1796.

*Primary Examiner*—Frank Duong
*Assistant Examiner*—Abdullah Riyami
(74) *Attorney, Agent, or Firm*—Garlick Harrison & Markison; Timothy W. Markison; Holly L. Rudnick

(57) ABSTRACT

A multiple stream cyclic-shifted delay transmitter including a baseband processing module and a plurality of RF transmit sections. The baseband processing module is operably coupled to convert outbound data into a plurality of transmit baseband signal streams and cyclic-shift delay at least one of the plurality of transmit baseband signal streams to produce at least one cyclic shift delayed transmit baseband signal stream. The plurality of RF) transmit sections is operably coupled to convert the plurality of transmit baseband signal streams and the at least one cyclic-shift delayed transmit baseband signal stream into a plurality of RF signals.

11 Claims, 10 Drawing Sheets

U.S. PATENT DOCUMENTS

| | | | |
|---|---|---|---|
| 2006/0268165 A1* | 11/2006 | van Nee | 348/388.1 |
| 2007/0021075 A1* | 1/2007 | Nakao | 455/101 |
| 2007/0140377 A1* | 6/2007 | Murakami et al. | 375/299 |
| 2007/0189409 A1* | 8/2007 | Hottinen | 375/267 |
| 2007/0263564 A1* | 11/2007 | Hansen et al. | 370/328 |
| 2008/0039107 A1* | 2/2008 | Ma et al. | 455/450 |

FOREIGN PATENT DOCUMENTS

| | | |
|---|---|---|
| WO | 02/25857 A1 | 3/2002 |

* cited by examiner

MULTIPLE STREAM CYCLIC-SHIFTED DELAY TRANSMITTER

BACKGROUND OF THE INVENTION

1. Technical Field of the Invention

This invention relates generally to wireless communications and more particularly to wireless communication transmitters.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In many systems, the transmitter will include one antenna for transmitting the RF signals, which are received by a single antenna, or multiple antennas, of a receiver. When the receiver includes two or more antennas, the receiver will select one of them to receive the incoming RF signals. In this instance, the wireless communication between the transmitter and receiver is a single-output-single-input (SISO) communication, even if the receiver includes multiple antennas that are used as diversity antennas (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennas to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

To further improve MISO wireless communications, transceivers may incorporate cyclic-shift delay diversity (CDD). As is known for MISO communications, CDD is a technique to transmit the same signals via multiple transmit antennas, where the signals are time-shifted with respect to one another. Such time-shifted provides a diversity gain by making the channel more frequency-selective to maximize coding gain. At receiver end, the receiver utilizes a typical minimum mean square error (MMSE) to detect the signals, thus, the receiver does not need any additional circuitry.

While CDD has been applied for MISO wireless communications, due to the additional complexities of MIMO wireless communications, it has not been efficiently applied to MIMO wireless communications.

Therefore, a need exists for a multiple stream cyclic-shifted delay transmitter for MIMO wireless communications.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
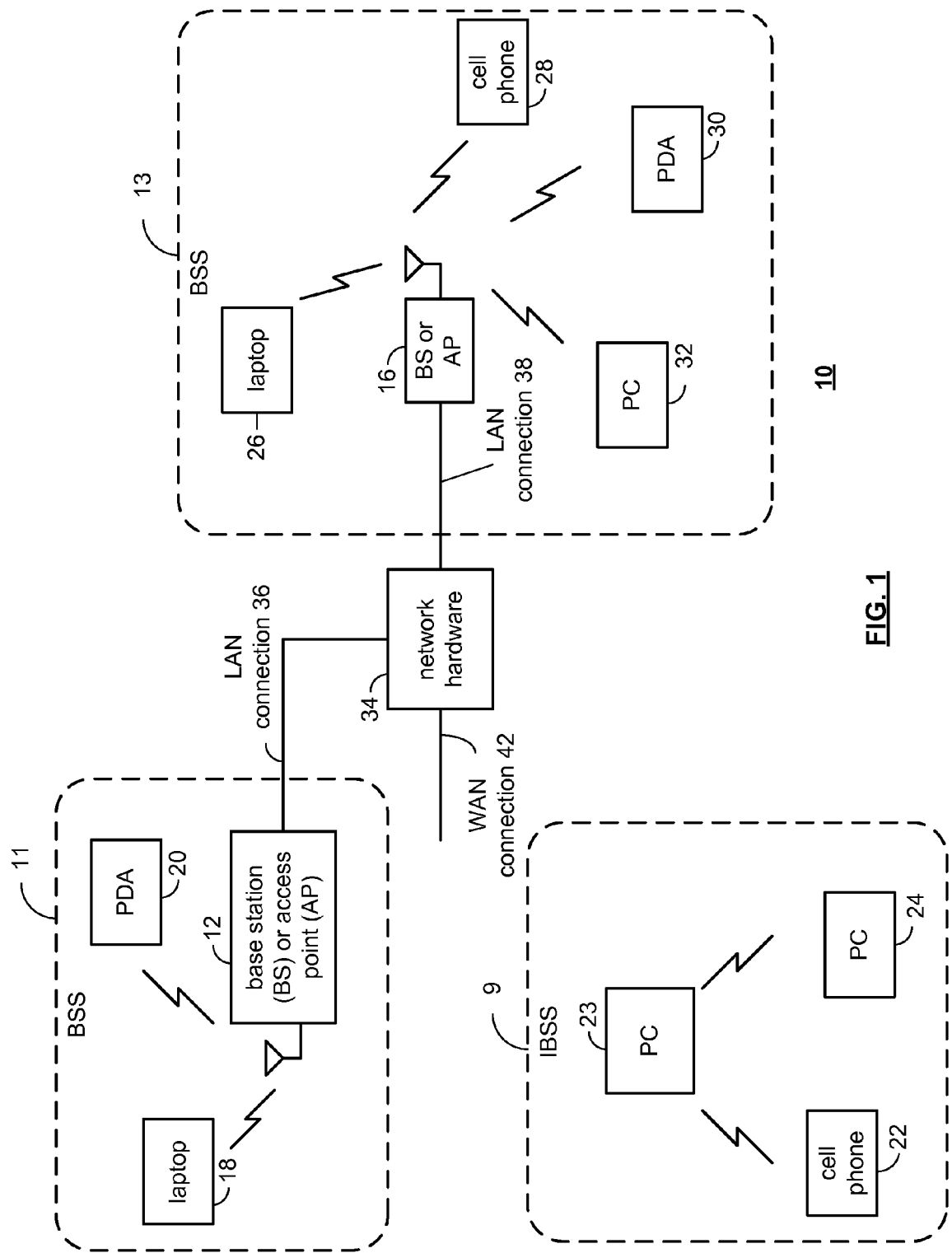
FIG. 1 is a schematic block diagram of a wireless communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems and like-type systems, while access points are used for in-home or in-building wireless networks (e.g., IEEE 802.11 and versions thereof, Bluetooth, and/or any other type of radio frequency based network protocol). Regardless of the particular type of communication system, each wireless communication device includes a built-in radio and/or is coupled to a radio.

Figure 2:
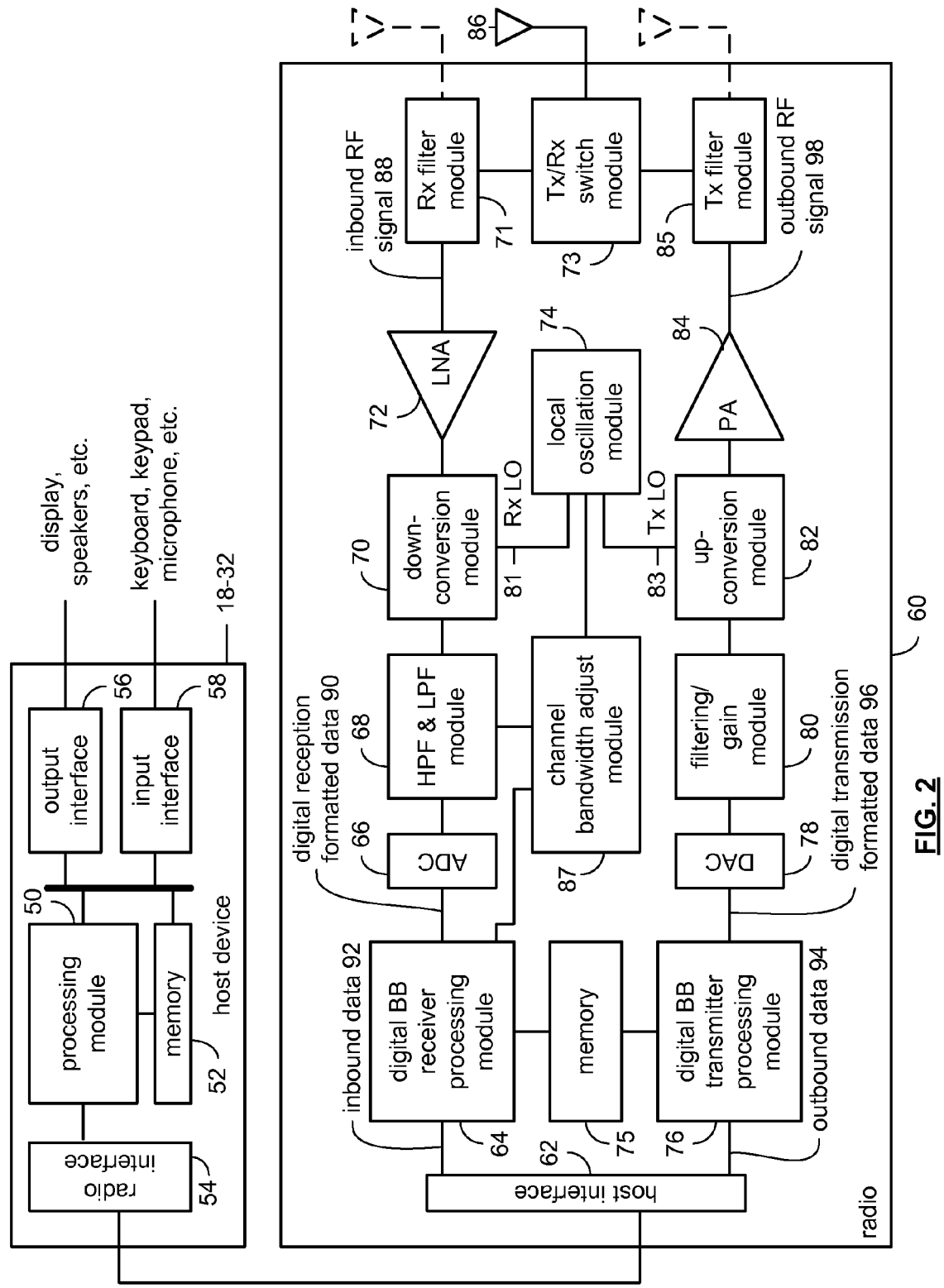
FIG. 2 is a schematic block diagram of a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, a radio interface 54, an input interface 58, and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a high pass and low pass filter module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, a channel bandwidth adjust module 87, and an antenna 86. The antenna 86 may be a single antenna that is shared by the transmit and receive paths as regulated by the TX/Rx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, logic circuitry, analog circuitry, digital circuitry, and/or any device that manipulates signals (analog and/or digital) based on operational instructions. The memory 75 may be a single memory device or a plurality of memory devices. Such a memory device may be a read only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11, Bluetooth, et cetera) to produce outbound baseband signals 96. The outbound baseband signals 96 will be digital base-band signals (e.g., have a zero IF) or a digital low IF signals, where the low IF typically will be in the frequency range of one hundred kilohertz to a few megahertz.

The digital-to-analog converter 78 converts the outbound baseband signals 96 from the digital domain to the analog domain. The filtering/gain module 80 filters and/or adjusts the gain of the analog signals prior to providing it to the IF mixing stage 82. The IF mixing stage 82 converts the analog baseband or low IF signals into RF signals based on a transmitter local oscillation 83 provided by local oscillation module 74. The power amplifier 84 amplifies the RF signals to produce outbound RF signals 98, which are filtered by the transmitter filter module 85. The antenna 86 transmits the outbound RF signals 98 to a targeted device such as a base station, an access point and/or another wireless communication device.

The radio 60 also receives inbound RF signals 88 via the antenna 86, which were transmitted by a base station, an access point, or another wireless communication device. The antenna 86 provides the inbound RF signals 88 to the receiver filter module 71 via the TX/Rx switch 73, where the Rx filter 71 bandpass filters the inbound RF signals 88. The Rx filter 71 provides the filtered RF signals to low noise amplifier 72, which amplifies the signals 88 to produce an amplified inbound RF signals. The low noise amplifier 72 provides the amplified inbound RF signals to the IF mixing module 70, which directly converts the amplified inbound RF signals into an inbound low IF signals or baseband signals based on a receiver local oscillation 81 provided by local oscillation module 74. The down conversion module 70 provides the inbound low IF signals or baseband signals to the filtering/gain module 68. The high pass and low pass filter module 68 filters, based on settings provided by the channel bandwidth adjust module 87, the inbound low IF signals or the inbound baseband signals to produce filtered inbound signals.

The analog-to-digital converter 66 converts the filtered inbound signals from the analog domain to the digital domain to produce inbound baseband signals 90, where the inbound baseband signals 90 will be digital base-band signals or digital low IF signals, where the low IF typically will be in the frequency range of one hundred kilohertz to a few megahertz. The digital receiver processing module 64, based on settings provided by the channel bandwidth adjust module 87, decodes, descrambles, demaps, and/or demodulates the inbound baseband signals 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
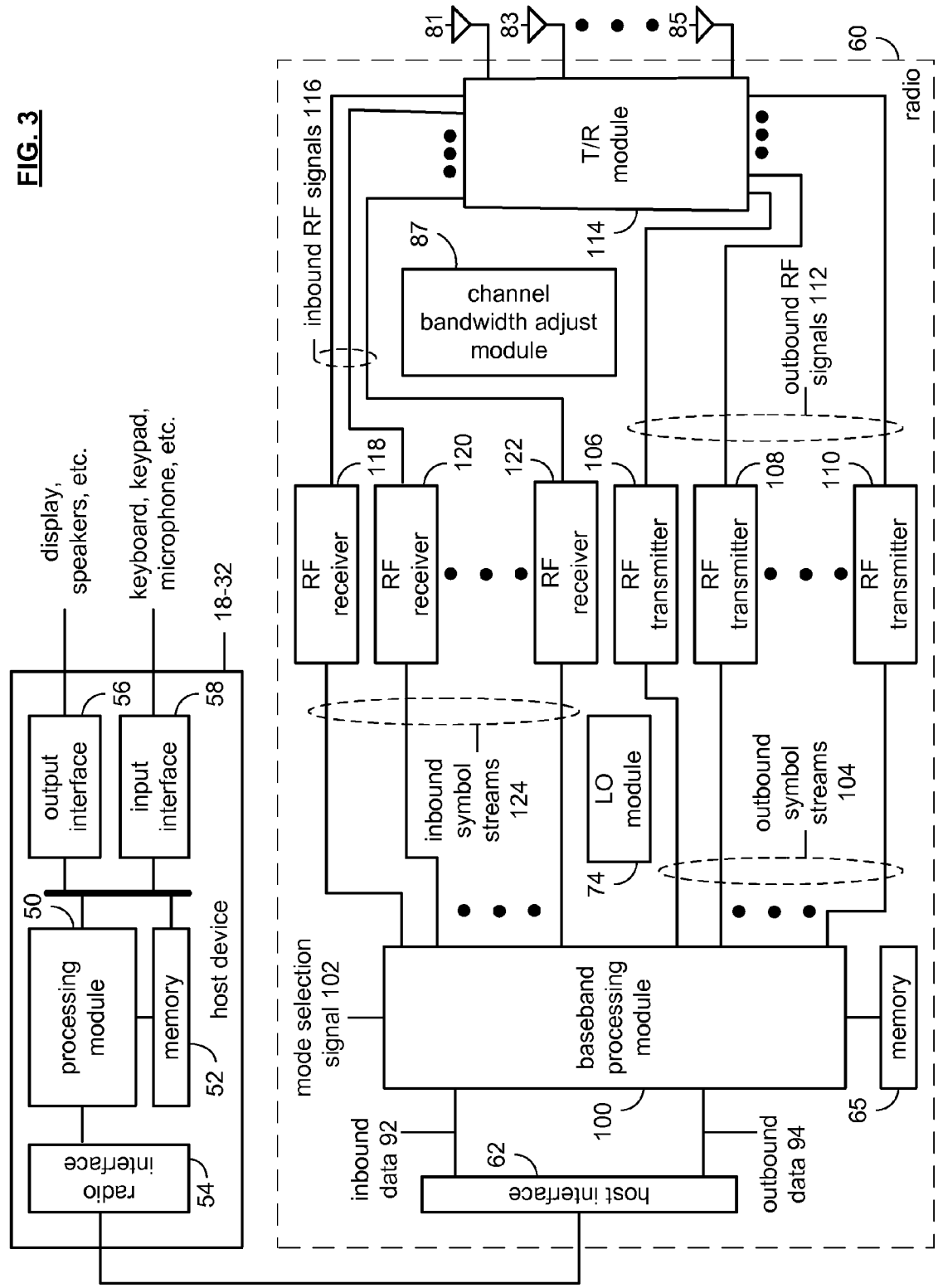
FIG. 3 is a schematic block diagram of another wireless communication device in accordance with the present invention.

FIG. 3 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 81-85, a plurality of RF receivers 118-120, a channel bandwidth adjust module 87, and a local oscillation module 74. The baseband processing module 100, in combination with operational instructions stored in memory 65, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing modules 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 64 receives the outbound data 88 and, based on a mode selection signal 102, produces one or more outbound symbol streams 90. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. The mode select signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode select signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode select signal 102 indicates 2, 3 or 4 antennas, the baseband processing module 100 will produce 2, 3 or 4 outbound symbol streams 104 from the outbound data 94.

Depending on the number of outbound streams 104 produced by the baseband module 10, a corresponding number of the RF transmitters 106-110 will be enabled to convert the outbound symbol streams 104 into outbound RF signals 112. In general, each of the RF transmitters 106-110 includes a digital filter and upsampling module, a digital to analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122. The RF receiver 118-122, based on settings provided by the channel bandwidth adjust module 87, converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device of FIG. 3 may be implemented using one or more integrated circuits. For example, the host device may be implemented on one integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Figure 4:
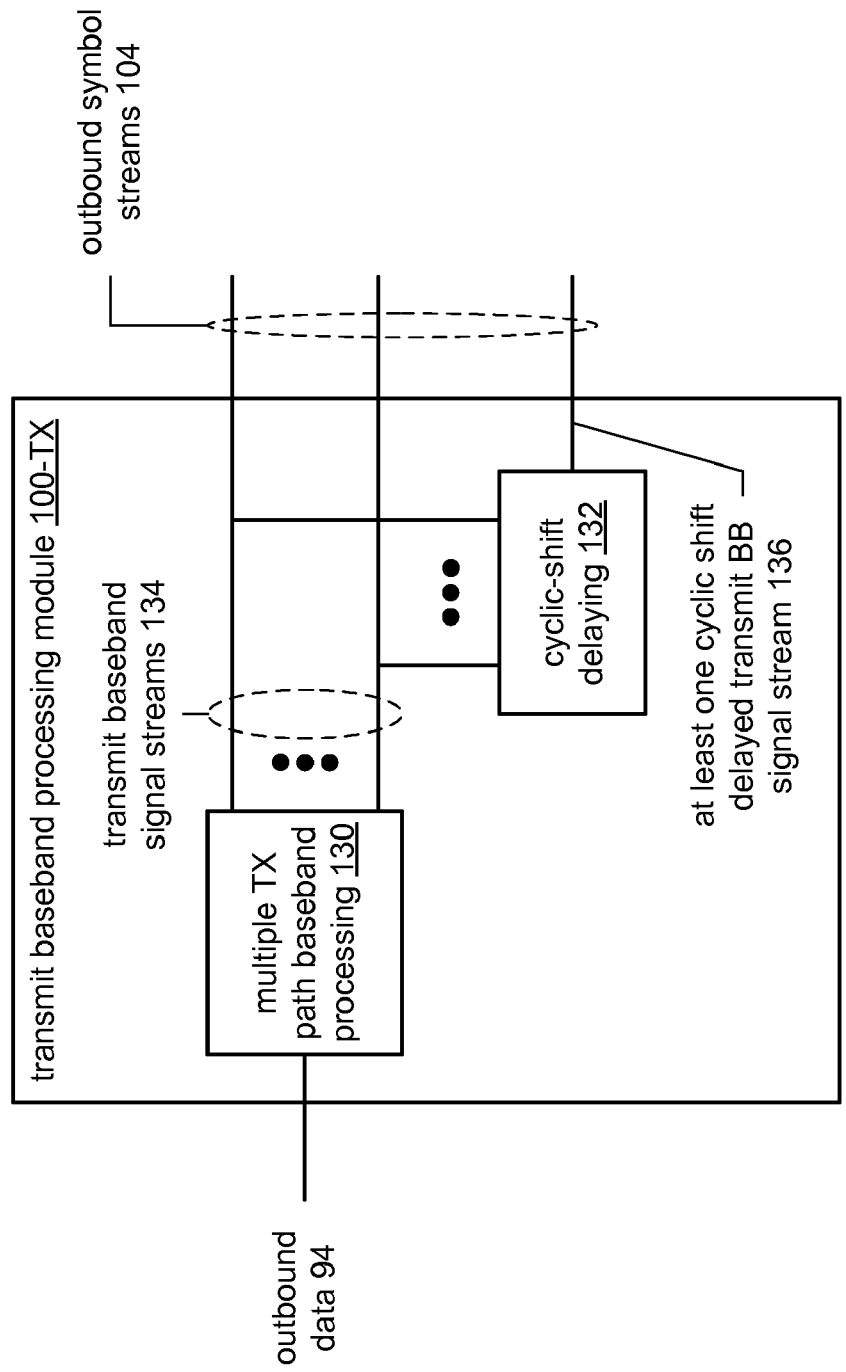
FIG. 4 is a schematic block diagram of a transmit baseband processing module in accordance with the present invention.

FIG. 4 is a functional schematic block diagram of a transmit baseband processing module 100-TX that includes a multiple transmit (TX) path baseband processing 130 and cyclic shift delaying 132. The multiple TX path baseband processing 130 processes outbound data 94 to produce a plurality of transmit baseband signal streams 134. This may be done in accordance with one or more wireless communication standards including, but not limited to, IEEE 802.11a, b, g, n, et cetera.

The cyclic shift delaying function 132 is operably coupled to cyclic shift delay at least one of the plurality of transmit baseband signal streams to produce at least one cyclic shift delayed transmit baseband (BB) signal stream 136. The transmit baseband signal streams 134 and the at least one cyclic shift delayed transmit baseband signal stream 136 comprise the outbound symbol streams 104. The cyclic shift delaying 132 is based on the mathematical concept that time delay in the time domain is equivalent with phase shift in the frequency domain: $FFT(x(t-n)) = X(f_k)\exp(-j2\pi n B_f)$, where $FFT(x(t)) = X(f)$, $B_f$ = Bandwidth/FFT size, k is the frequency index and n is the cyclic-shift delay diversity (CDD) time.

In one embodiment, where a channel has a bandwidth of 20 MHz and 64 tones, $B_1=0.1325$ MHz and CDD=50 nanoseconds then $\exp(-j2\pi nB_f)=\exp(-j2\pi(k/32))$.

The cyclic shift delaying 132 may be done in a variety of ways. For example, the cyclic shift delaying may be done in a circular ordering, over time, where the plurality of transmit baseband signals are cyclic shift delayed such that the channels over which the plurality of RF signals are transmitted are randomized. By randomizing the channels, transmit diversity gain is realized and the channels are more frequency selective, which minimizes code and gain.

Figure 5:
FIG. 5 is a diagram depicting cyclic shift delay diversity in accordance with the present invention.
Figure 6:
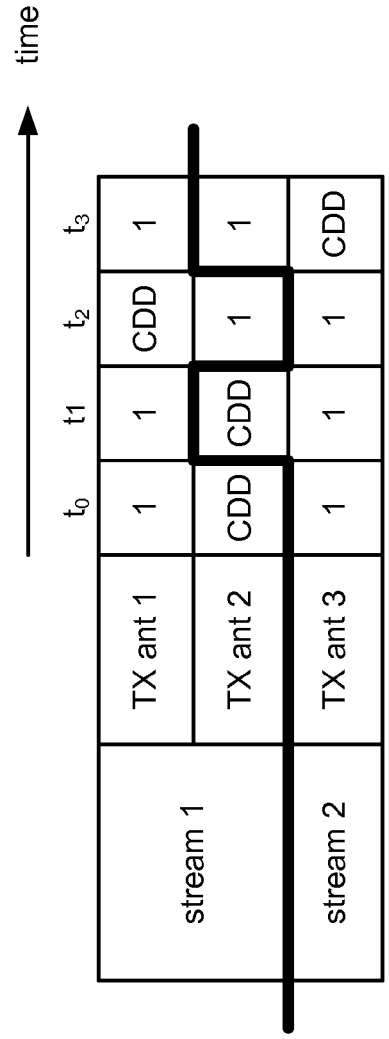
FIG. 6 is a diagram depicting an alternate cyclic shift delay diversity in accordance with the present invention.

In another embodiment, the cyclic shift delaying 132 may be done in a circular ordering that includes, for each time interval of the circular ordering, where a time interval may correspond to the transmission of a symbol within an OFDM transmission, or a frame of an OFD transmission, a frame or packet of another wireless communication transmission, by providing the plurality of transmit baseband signal streams to selected ones of the plurality of RF transmission sections. The circular ordering continues by providing the at least one cyclic shift delayed transmit baseband signal stream to at least one remaining RF transmit section of the plurality of RF transmit sections. The circular ordering continues, from at least one time interval to another time interval, by providing the plurality of transmit baseband signal streams to different selected ones of the plurality of RF transmission sections. The circular ordering continues by providing the at least one cyclic shifted delayed transmit baseband signal stream to at least one different remaining RF transmit section of the plurality of RF transmit sections. Accordingly, over time the transmit paths are processing baseband signal streams that are switched from being the cyclic shift delayed representation of the baseband signal or the signal itself and the manner in which they are provided to the RF transmission paths is varied such that the randomization is achieved. In an embodiment, the circular ordering may include some time interval to time interval segments that don't change. FIGS. 5 and 6 are graphical representations of the circular ordering.

FIG. 5 is a diagram depicting circular ordering of a cyclic shift delayed diversity system that includes two baseband transmit streams (stream 1 and stream 2) and four transmit antennas (TXANT1-4). The illustration further includes a time component having four time intervals ($t_0$-$t_3$). The time intervals may correspond to the transmission of a symbol, a frame, a packet or any other wireless transmission time delineation metrics. In this illustration at time $t_0$, stream 1 is provided without cyclic shift delaying to transmit antenna 1, which was represented by 1 and a cyclic shift delayed representation of stream 1 is provided to transmit antenna 2, which is represented by CDD. During time interval $t_0$, stream 2 is provided as an undelayed representation to transmit antenna 3 and a cyclic shift delayed representation is provided to transmit antenna 4. At the next time interval $t_1$ the stream 1 is provided to the transmit antenna 1 and transmit antenna 2 as was done during time interval $t_0$. For stream 2, the undelayed representation of stream 2 is provided to transmit antenna 4 while the cyclic delayed representation of stream 2 is provided to transmit antenna 3.

At time interval $t_2$, the cyclic delayed representation of stream 1 is provided to transmit antenna 1 while the non-delayed representation of stream 1 is provided to antenna 2. Also during time interval $t_2$ the non-delayed representation of stream 2 is provided to transmit antenna 3 while the delayed representation is provided to transmit antenna 4. At time interval $t_3$ the undelayed representation of stream 1 is provided to transmit antenna 2 and the delayed representation of stream 1 is provided to transmit antenna 1. Also during time interval $t_3$ the undelayed representation of stream 2 is provided to transmit antenna 4 and the delayed representation is provided to transmit antenna 3.

As one of ordinary skill in the art will appreciate, other patterns of providing the delayed and undelayed representations of multiple streams to the transmit antennas may be achieved for example, the delayed representation of stream 1, for example, the transmit antennas 2 and 3 in the illustration of FIG. 5 may be swapped such that stream 1 utilizes transmit antenna 3 and stream 2 utilizes transmit antenna 2. Other variations are readily apparent. In addition, one of ordinary skill in the art will appreciate that the illustration of FIG. 5 includes a corresponding number of cyclic shift delay elements to the number of streams. As such, in this illustration, each stream has an undelayed representation and a cyclic delayed representation. As one of ordinary skill in the art will appreciate, additional cyclic delaying may be done for each stream such that each stream has multiple cyclic shift delayed representations of it that are provided to different transmit paths. For example, if the illustration of FIG. 5 were expanded to include six transmit antennas each stream would have two cyclic delayed representations wherein the providing of the undelayed and cyclic delayed representations of the streams to the antennas would be done in an ordering pattern similar to that illustrated in FIG. 5.

FIG. 6 is a diagram illustrating the circular ordering of the cyclic shift delay processing 132 where two streams (stream 1 and stream 2) share a cyclic shift delay element. In this illustration, the transmitter includes three transmit antennas (TX ANT 1-3). The illustration of FIG. 6 further includes four time intervals $t_0$-$t_3$, which correspond to the transmission of a symbol, frame, grouping of symbols, packets and/or any other time delineation within a wireless transmission system. At time interval $t_0$, stream 1 is cyclic shift delayed and provided to transmit antenna 2. The undelayed representation of stream 1 is provided to antenna 1. The unshifted representation of stream 2 is provided to transmit antenna 3.

At time interval $t_1$, the cyclic shift delaying is done on stream 2 and provided to antenna 2. Also during time interval $t_1$, the undelayed representation of stream 1 is provided to transmit antenna 1 and the undelayed representation of stream 2 is provided to antenna 3. At time interval $t_2$, the first stream is again cyclic shift delayed and provided to transmit antenna 1. The undelayed representation of stream 1 is provided to transmit antenna 2 and the undelayed representation of stream 2 is provided to antenna 3. At time interval $t_3$ the $2^{nd}$ stream is cyclic shift delayed and provided to transmit antenna 3. The undelayed representation of stream 2 is provided to transmit antenna 2 and the undelayed representation of stream 1 is provided to transmit antenna 1.

Figure 7:
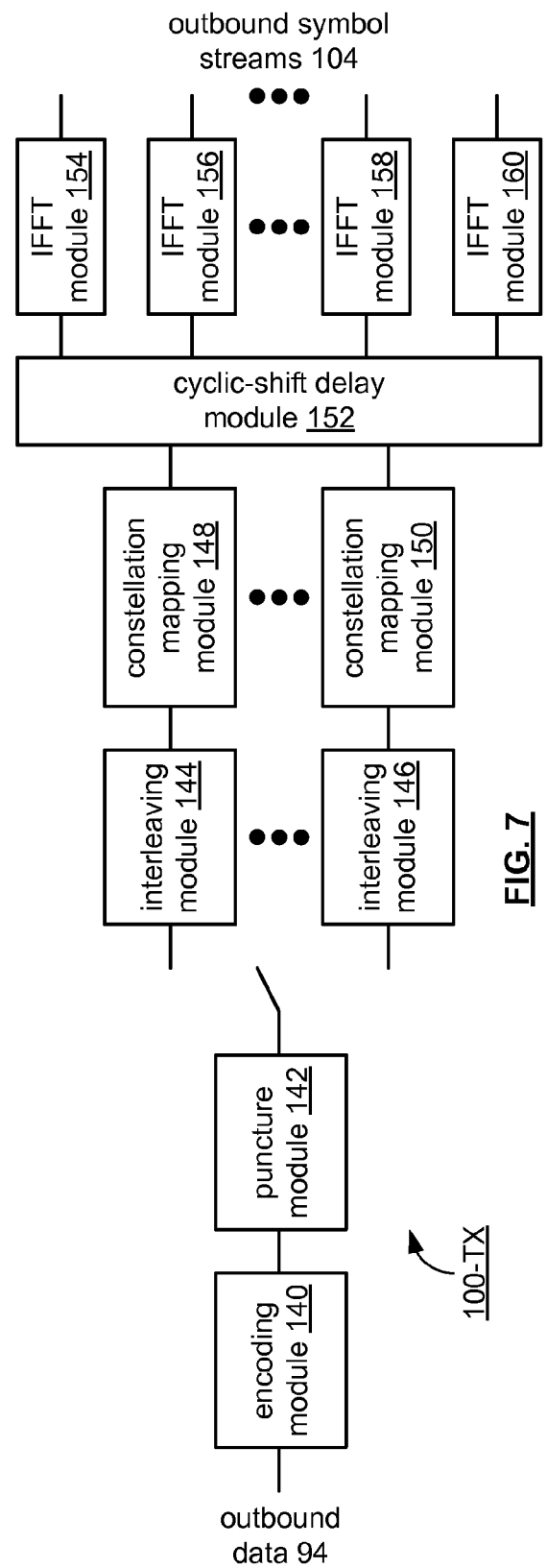
FIG. 7 is a schematic block diagram of a transmit baseband processing module in accordance with the present invention.

FIG. 7 is a schematic block diagram of an embodiment of a transmit baseband processing module 100-TX that includes an encoding module 140, a puncture module 142, a plurality of interleaving modules 144-146, a plurality of constellation mapping modules 148-150, a cyclic shift delay module 152, and a plurality of inverse fast Fourier transform (IFFT) modules 154-160.

The encoding module 140 is operably coupled to encode outbound data 94 to produce encoded outbound data and to provide it to the puncture module 142. The puncture module 142 may puncture the encoded data, which is subsequently provided to the plurality of interleaving modules 144-146. The plurality of interleaving modules is operably coupled to convert the encoded outbound data into a plurality of interleaved data streams. The plurality of constellation mapping modules 148-150 is operably coupled to map the plurality of interleaved data streams into a plurality of streams of symbols. As one of ordinary skill in the art will appreciate, the encoding module 140, the puncture module 142, the interleaving modules 144-146 and the constellation mapping modules 148-150 may operate in accordance with one or more wireless communication standards including, but not limited to, IEEE 802.11a, b, g, et cetera.

The cyclic shift delay module 152 is operably coupled to cyclic shift delay at least one of the plurality of streams of symbols to produce at least one cyclic shift delayed stream of symbols. The cyclic shift delay module provides the at least one cyclic shift delayed stream of symbols and the plurality of stream of symbols to the plurality of IFFT modules 154-160 which is operably coupled to convert the plurality of streams of symbols and the at least one cyclic shift delayed stream of symbols from a frequency domain to a time domain to produce outbound symbol streams 104. The outbound symbol streams 104 are provided to the RF transmission sections 106-110 of FIG. 3.

Figure 8:
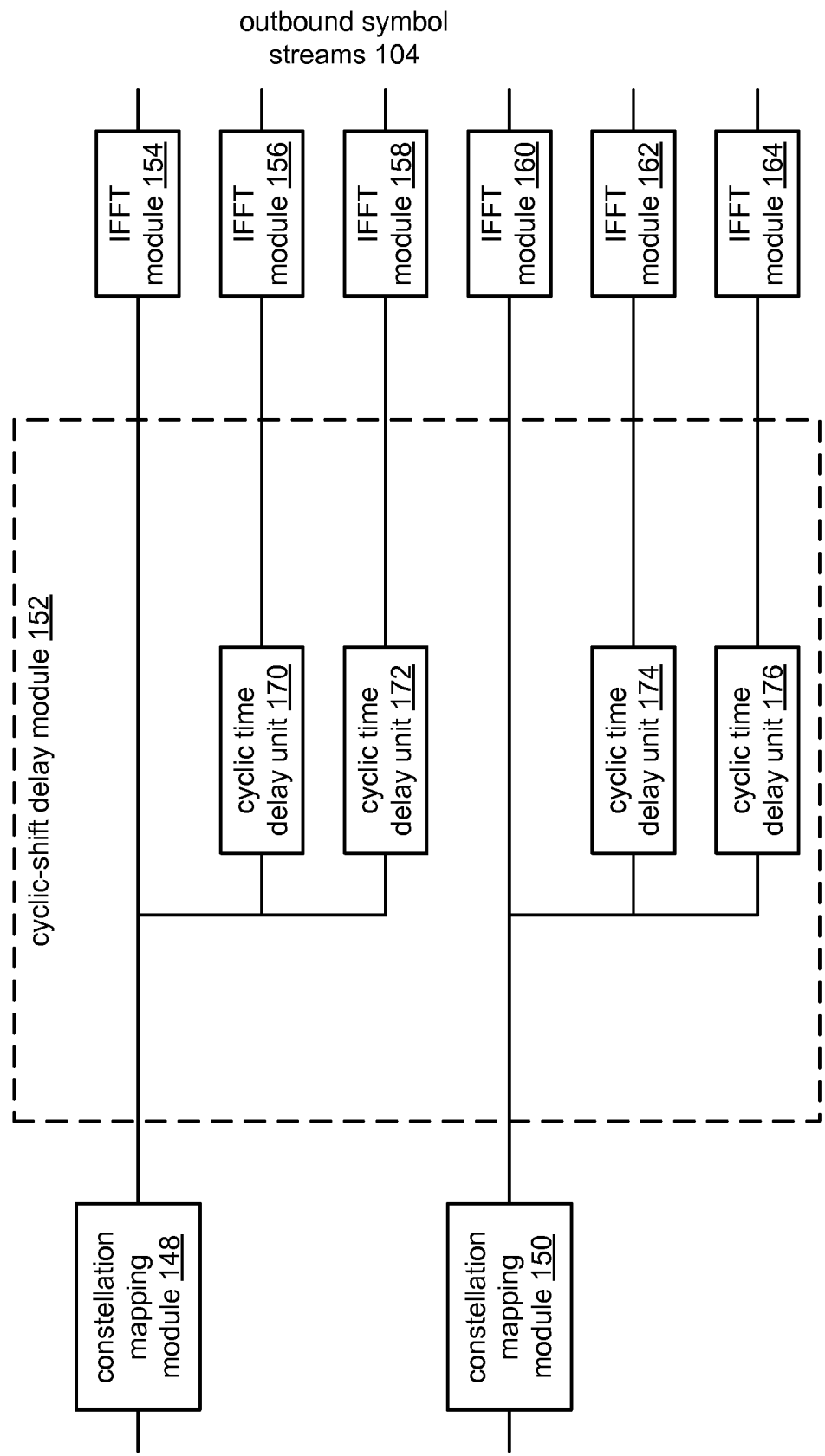
FIG. 8 is a schematic block diagram of a cyclic shift delay module in accordance with the present invention.
Figure 9:
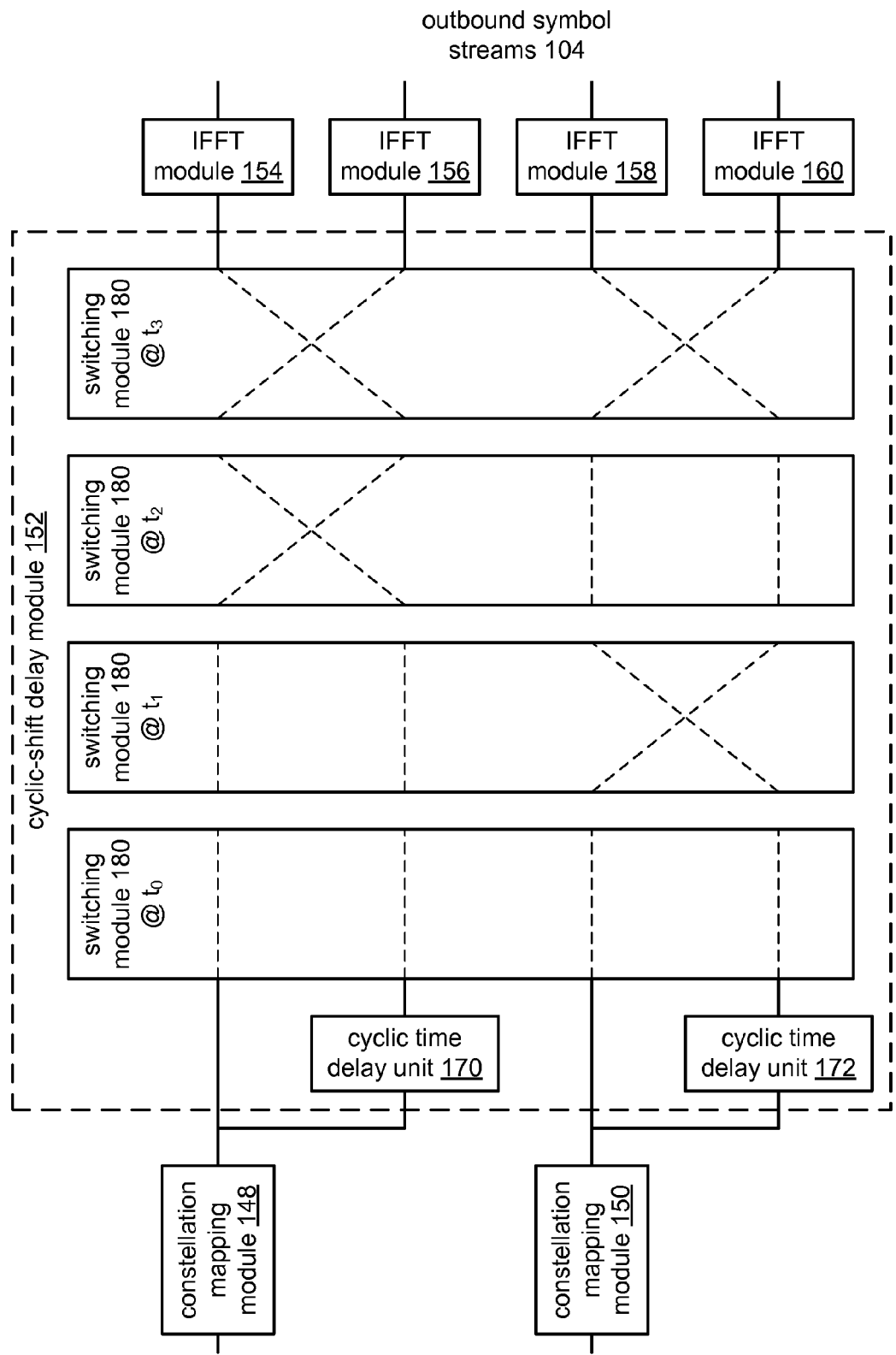
FIG. 9 is a functional diagram of a cyclic shift delay module in accordance with the present invention.
Figure 10:
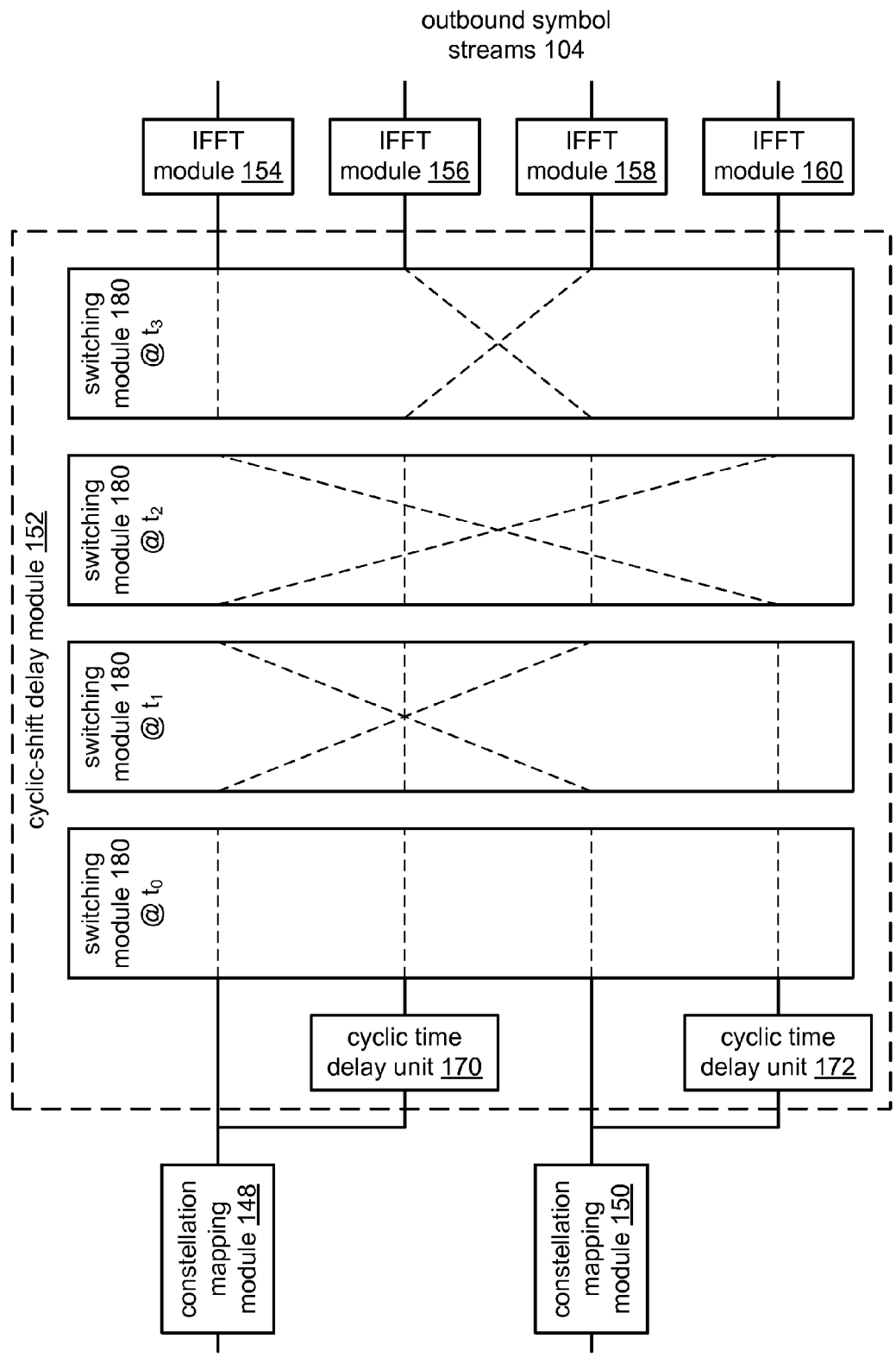
FIG. 10 is another functional diagram of a cyclic shift delay module in accordance with the present invention.

The cyclic shift delay module 152 may perform a circular ordering, over time of the cyclic shift delaying of the plurality of streams of symbols to produce the at least one cyclic shift delayed stream of symbols. In FIGS. 8-10 illustrate various embodiments and functionality of the cyclic shift delay module 152.

FIG. 8 is a schematic block diagram of the cyclic shift delay module 152 operably coupled to the constellation mapping modules 148 and 150 and to the plurality of IFFT modules 154-164. In this embodiment, the cyclic shift delay module 152 includes four cyclic time delay units 170-176. The amount of delay introduced by each of the cyclic time delay units 170-176 is application dependent. For example, within an OFDM transmission that is transmitted on a 20 MHz channel including 64 subcarriers, the delay may be approximately 50 nanoseconds for the $1^{st}$ delay and 100 nanoseconds for the $2^{nd}$ delay.

In this illustration, the baseband transmit processing module includes two transmit streams that are processed by the constellation mapping modules 148 and 150. The cyclic shift delay module 152 passes an undelayed representation of each stream to IFFT modules 154 and 160. Cyclic time delayed unit 170 provides a $1^{st}$ time delayed representation of the stream of symbols produced by constellation mapping module 148 and provides the delayed representation to IFFT module 156. Cyclic time delayed unit 172 provides a $2^{nd}$ time delay of the stream of symbols produced by constellation mapping module 148 and provides the delayed representation to IFFT module 158.

Cyclic time delay unit 174 provides a $1^{st}$ time delay representation of the stream of symbols produced by constellation mapping module 150 and provides the delayed representation to IFFT module 162. Cyclic time delay unit 176 provides the $2^{nd}$ time delay of the stream of symbols produced by constellation mapping module 150 and provides the delayed representation to IFFT module 164.

In this illustration, each stream includes two cyclic time delay units. In general, the number of delay units may be an integer multiple of the number of streams. For example, the integer multiple may be one such that in this example only cyclic time delay units 170 and 174 would be present.

FIG. 9 is a functional schematic block diagram of the cyclic delay module 152 implementing a circular ordering over time of the cyclic delaying. In this illustration, the cyclic shift delay module 152 includes two cyclic time delay units 170 and 172. The cyclic shift delay module 152 also includes a switching module 180 that, over time, is configurable to couple the delayed and undelayed representations of the streams of symbols produced by the constellation mapping modules 148 and 150 to the plurality of IFFT modules 154-160.

At time interval $T_0$, switching module 180 is configured to provide the undelayed representation of the stream of symbols produced by constellation mapping module 148 to IFFT module 154 and the delayed representation thereof to IFFT module 156. A switching module 180, at time $T_0$ is also configured to provide the undelayed representation of the stream of symbols produced by constellation mapping module 150 to IFFT module 158 and the delayed representation thereof to IFFT module 160.

At time interval $T_1$, switching module 180 is configured to provide the undelayed representation of the stream of symbols produced by constellation mapping module 148 to IFFT module 154 and the delayed representation thereof to IFFT module 156. The switching module 180 is also configured at time $T_1$ to provide the undelayed representation of the symbols produced by constellation mapping module 150 to IFFT module 160 and the delayed representations thereof to IFFT module 158.

At time interval $T_2$, the switching module 180 is configured to provide the undelayed symbols produced by mapping module 148 to IFFT module 156 and the delayed representations thereof to IFFT module 154. Also during time interval $T_2$, the switching module 180 is configured to provide the undelayed symbols produced by constellation mapping module 150 to IFFT module 158 and the delayed representations thereof to IFFT module 160.

At time interval $T_3$, the switching module 180 is configured to provide the undelayed symbols produced by constellation mapping module 148 to IFFT module 156 and the delayed representations thereof to IFFT module 154. Also during time interval $T_3$, the switching module 180 is configured to provide the undelayed symbols produced by constellation mapping module 150 to IFFT module 160 and the delayed representations thereof to IFFT module 158.

FIG. 10 is a functional schematic block diagram of the cyclic shift delay module 152 implementing a different circular ordering of the cyclic shift delaying. In this embodiment, the cyclic shift delay module 152 includes two cyclic time delay units 170 and 172 and switching module 180. At time interval $T_0$, the switching module 180 is configured as it was with respect to FIG. 9. At time interval $T_1$, the switching module 180 is configured to provide the undelayed symbols produced by constellation mapping module 148 to IFFT module 158 and the delayed representations thereof to IFFT module 156. The switching module 180 is also configured to provide the undelayed symbols produced by constellation mapping module 150 to IFFT module 154 and the delayed representations thereof to IFFT module 160. The switching module 180 at time intervals $T_2$ and $T_3$ provide the coupling as shown. The circular ordering may continue such that over time each IFFT module 154-160 processes a delayed and undelayed representation of the symbols produced by constellation mapping module 148 and 150 to randomize the channels over which the RF signals are transmitted.

Figure 11:
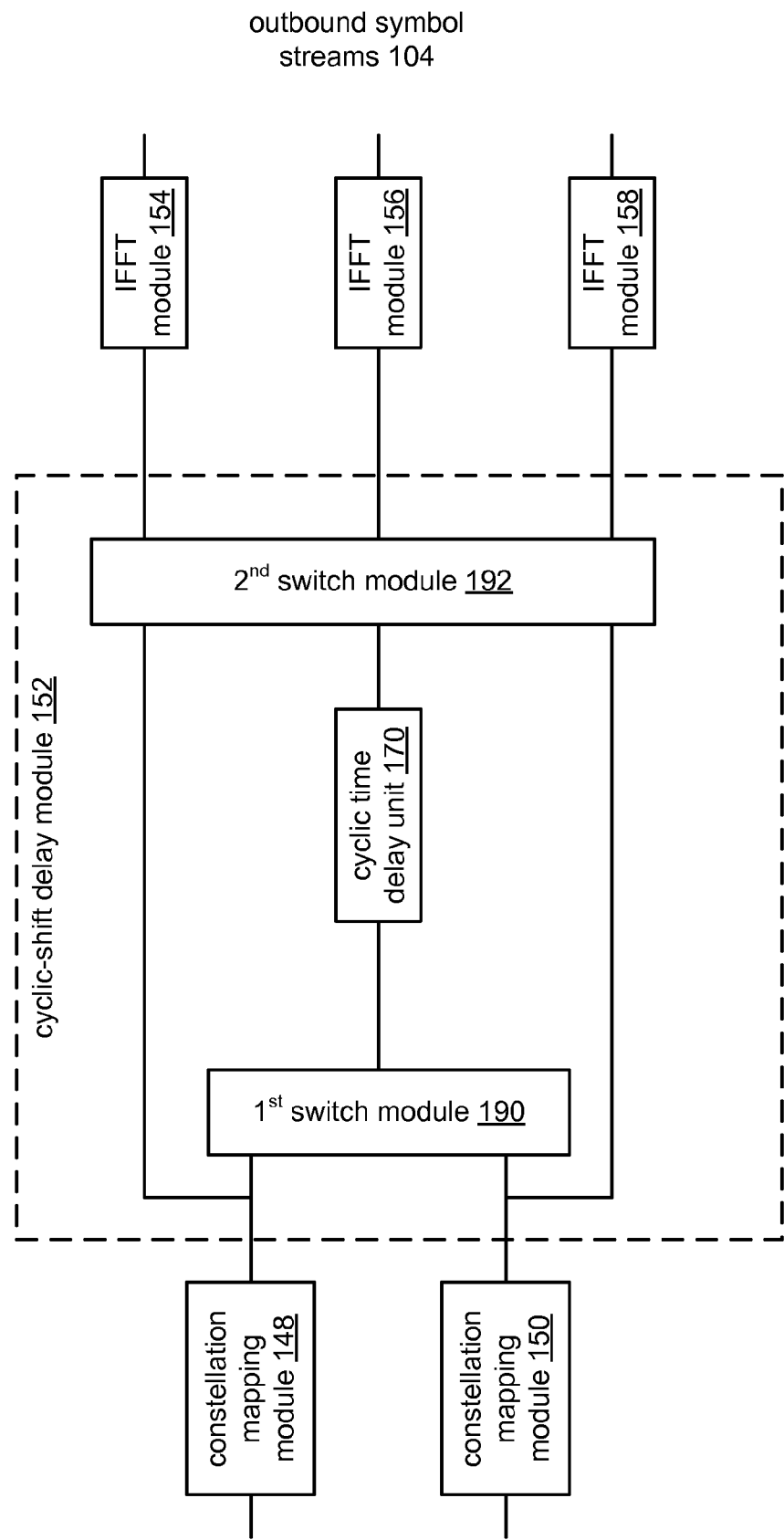
FIG. 11 is a schematic block diagram of another embodiment of a cyclic shift delay module in accordance with the present invention.

FIG. 11 is a schematic block diagram of another embodiment of the cyclic shift delay module 152 that includes a $1^{st}$ switching module 190, a cyclic time delay unit 170 and a $2^{nd}$ switching module 192. In this illustration, the transmit baseband processing module is processing two streams of data via constellation mapping module 148 and 150. In addition, the baseband transmit processing module includes three IFFT modules 154-158.

The $1^{st}$ switching module 190 is configurable to, on a per-time-interval basis, to provide either the symbols produced by constellation mapping module 148 or constellation mapping module 150 to the cyclic time delayed unit 170. The $2^{nd}$ switching module 192 is operably coupled to provide the undelayed symbols produced by constellation mapping module 148 and 150 to two of the IFFT modules 154-158. The $2^{nd}$ switching module 192 is also operably coupled to provide the delayed representation of the symbols produced by constellation mapping module 148 or 150 to the remaining IFFT modules 154-158. In one embodiment, the cyclic shift delaying module 152 may follow a pattern as illustrated in FIG. 6.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a multiple stream cyclic shift delayed transmitter that is configurable for MIMO communications. As one of ordinary skill in the art will appreciate, other embodiments may be derived from the teachings of the present invention without deviating from the scope of the claims.

What is claimed is:

1. A multiple stream cyclic-shifted delay transmitter comprises:
    a baseband processing module operable to convert outbound data into a plurality of transmit baseband signal streams, the baseband processing module including a cyclic time delay unit operable to cyclic-shift delay at least one of the plurality of transmit baseband signal streams by a static delay amount to produce at least one cyclic-shift delayed transmit baseband signal stream; and
    a plurality of radio frequency (RF) transmit sections coupled to the baseband processing module and operable to convert the plurality of transmit baseband signal streams and the at least one cyclic-shift delayed transmit baseband signal into a plurality of RF signals;
    wherein the baseband processing module further includes a first switching module operable to selectively couple the plurality of transmit baseband signal streams to the cyclic time delay unit over a plurality of time intervals such that for a given time interval of the plurality of time intervals, the at least one cyclic-shift delayed transmit baseband signal stream is produced; and
    wherein the baseband processing module further includes a second switching module coupled between the cyclic time delay unit and the plurality of RF transmit sections and operable to circular order coupling of the cyclic time delay unit and the plurality of transmit baseband signal streams to the plurality of RF transmit sections such that:
    for each time interval of the circular order:
        the second switching module couples the cyclic time delay unit to a selected one of the plurality of RF transmit sections and couples the plurality of transmit baseband signal streams to remaining ones of the plurality of transmit RF sections; and
    from at least one time interval to another time interval of the circular ordering:
        the second switching module couples the cyclic time delay unit to different selected ones of the plurality of RF transmit sections and couples the plurality of transmit baseband signal streams to different remaining ones of the plurality of RF transmit sections such that channels over which a plurality of radio frequency (RF) signals are transmitted are randomized.

2. The multiple stream cyclic-shifted delay transmitter of claim 1, wherein the circular ordering comprises:
    for each time interval of the circular ordering:
        providing the plurality of transmit baseband signal streams to selected ones of the plurality of RF transmit sections; and
        providing the at least one cyclic-shift delayed transmit baseband signal stream to at least one remaining RF transmit section of the plurality of RF transmit sections;
    from at least one time interval to another time interval of the circular ordering:
        providing the plurality of transmit baseband signal streams to different selected ones of the plurality of RF transmit sections; and
        providing the at least one cyclic-shift delayed transmit baseband signal stream to at least one different remaining RF transmit section of the plurality of RF transmit sections.

3. The multiple stream cyclic-shifted delay transmitter of claim 1, wherein the cyclic-shift delay of at least one of the plurality of transmit baseband signal streams comprises:
    from at least one time interval to another time interval of the circular ordering, cyclic-shift delaying at least one other of the plurality of transmit baseband signal streams.

4. A transmit baseband processing module comprises:
    an encoding module operable to encode outbound data to produce encoded outbound data;
    an interleaving module coupled to the encoding module and operable to convert the encoded outbound data into a plurality of interleaved data streams;
    a plurality of mapping modules coupled to the interleaving module and operable to map the plurality of interleaved data streams into a plurality of streams of symbols;
    a cyclic-shift delay module operable to cyclic-shift delay at least one of the plurality of streams of symbols by a static delay amount to produce at least one cyclic-shift delayed stream of symbols;
    a plurality of inverse fast Fourier transform (IFFT) modules operable to convert the plurality of streams of symbols and the at least one cyclic-shift delayed stream of symbols from a frequency domain to a time domain;

a first switching module coupled between the plurality of mapping modules and the cyclic-shift delay module and operable to selectively couple the plurality of mapping modules to the cyclic-shift delay module over a plurality of time intervals such that for a given time interval of the plurality of time intervals, the at least one cyclic-shift delayed stream of symbols is produced; and a second switching module coupled between the cyclic-shift delay module and the plurality of IFFT modules, wherein the second switching module circular orders, over time, coupling of the cyclic-shift delay module and the plurality of mapping modules to the plurality of IFFT modules such that:

for each time interval of the circular order:
the second switching module couples the cyclic-shift delay module to a selected one of the plurality of IFFT modules and couples the plurality of mapping modules to remaining ones of the plurality of IFFT modules; and from at least one time interval to another time interval of the circular ordering:
the second switching module couples the cyclic-shift delay module to different selected ones of the plurality of IFFT modules and couples the plurality of mapping modules to different remaining ones of the plurality of IFFT modules to randomize channels over which a plurality of radio frequency (RF) signals are transmitted, wherein the plurality of RF signals have a component corresponding to the time domain plurality of streams of symbols.

5. The transmit baseband processing module of claim 4, wherein the cyclic-shift delay module comprises:
a plurality of cyclic time delay units, each providing a respective static delay amount, wherein a number of the plurality of cyclic time delay units corresponds to an integer multiple of a number of the plurality of streams of symbols, wherein the plurality of cyclic time delay units cyclic-shift delay the plurality of streams of symbols by the respective static delay amounts to produce a plurality of cyclic-shift delayed streams of symbols that includes the at least one cyclic-shift delayed stream of symbols.

6. The transmit baseband processing module of claim 5, wherein the second switching module further functions to circular order the coupling of the plurality of cyclic time delay units and the plurality of mapping modules to the plurality of IFFT modules to:

for each time interval of the circular order:
couple the plurality of cyclic time delay units to selected ones of the plurality of IFFT modules; and
couple the plurality of mapping modules to remaining ones of the plurality of IFFT modules;

from at least one time interval to another time interval of the circular ordering:
couple the plurality of cyclic time delay units to different selected ones of the plurality of IFFT modules; and
couple the plurality of mapping modules to different remaining ones of the plurality of IFFT modules.

7. The transmit baseband processing module of claim 4, wherein the cyclic-shifted delay module comprises:
a cyclic time delay unit; and
the first switching module, wherein the first switching module selectively couples the plurality of mapping modules to the cyclic time delay unit over the plurality of time intervals, wherein the cyclic time delay unit cyclic-shift delays the plurality of streams of symbols to produce a plurality of cyclic-shift delayed streams of symbols, wherein, for a given time interval of the plurality of time intervals, the at least one cyclic-shift delayed stream of symbols is produced.

8. A multiple stream cyclic-shifted delay transmitter comprises:
a baseband processing module including:
an encoding module operable to encode outbound data to produce encoded outbound data;
an interleaving module coupled to the encoding module and operable to convert the encoded outbound data into a plurality of interleaved data streams;
a plurality of mapping modules coupled to the interleaving module and operable to map the plurality of interleaved data streams into a plurality of streams of symbols;
a cyclic-shift delay module operable to cyclic-shift delay at least one of the plurality of streams of symbols by a static delay amount to produce at least one cyclic-shift delayed stream of symbols;
a plurality of inverse fast Fourier transform (IFFT) modules operable to convert the plurality of streams of symbols and the at least one cyclic-shift delayed stream of symbols from a frequency domain to a time domain to produce a plurality of time domain streams of symbols;
a first switching module coupled between the plurality of mapping modules and the cyclic-shift delay module and operable to selectively couple the plurality of mapping modules to the cyclic-shift delay module over a plurality of time intervals such that for a given time interval of the plurality of time intervals, the at least one cyclic-shift delayed stream of symbols is produced; and
a second switching module coupled between the cyclic-shift delay module and the plurality of IFFT modules, wherein the second switching module circular orders, over time, coupling of the cyclic-shift delay module and the plurality of mapping modules to the plurality of IFFT modules such that:

for each time interval of the circular order:
the second switching module couples the cyclic-shift delay module to a selected one of the plurality of IFFT modules and couples the plurality of mapping modules to remaining ones of the plurality of IFFT modules; and from at least one time interval to another time interval of the circular ordering:
the second switching module couples the cyclic-shift delay module to different selected ones of the plurality of IFFT modules and couples the plurality of mapping modules to different remaining ones of the plurality of IFFT modules; and a plurality of radio frequency (RF) transmit sections operable to convert the plurality of time domain streams of symbols into a plurality of RF signals.

9. The multiple stream cyclic-shifted delay transmitter of claim 8, wherein the cyclic-shift delay module comprises:
a plurality of cyclic time delay units, each providing a respective static delay amount, wherein a number of the plurality of cyclic time delay units corresponds to an integer multiple of a number of the plurality of streams of symbols, wherein the plurality of cyclic time delay units cyclic-shift delay the plurality of streams of symbols by the respective static delay amounts to produce a plurality of cyclic-shift delayed streams of symbols that includes the at least one cyclic-shift delayed stream of symbols.

10. The multiple stream cyclic-shifted delay transmitter of claim 9, wherein the second switching module further functions to circular order the coupling of the plurality of cyclic time delay units and the plurality of mapping modules to the plurality of IFFT modules to:

for each time interval of the circular order:

couple the plurality of cyclic time delay units to selected ones of the plurality of IFFT modules; and couple the plurality of mapping modules to remaining ones of the plurality of IFFT modules;

from at least one time interval to another time interval of the circular ordering:

couple the plurality of cyclic time delay units to different selected ones of the plurality of IFFT modules; and couple the plurality of mapping modules to different remaining ones of the plurality of IFFT modules.

11. The multiple stream cyclic-shifted delay transmitter of claim 8, wherein the cyclic-shift delay module comprises:

a cyclic time delay unit; and the first switching module, wherein the first switching module selectively couples the plurality of mapping modules to the cyclic time delay unit over a plurality of time intervals, wherein the cyclic time delay unit cyclic-shift delays the plurality of streams of symbols to produce a plurality of cyclic-shift delayed streams of symbols, wherein, for a given time interval of the plurality of time intervals, the at least one cyclic-shift delayed stream of symbols is produced.

* * * * *